United States Patent [19]
Williams

[11] Patent Number: 5,979,849
[45] Date of Patent: Nov. 9, 1999

[54] EYEGLASSES HOLDER AND CLEANER STATION

[76] Inventor: Walter Samuel Williams, 2100 Indian Creek Blvd. E., Apt. A324, Vero Beach, Fla. 32966

[21] Appl. No.: 08/965,558

[22] Filed: Nov. 6, 1997

[51] Int. Cl.⁶ ........................................................ A47F 7/02
[52] U.S. Cl. .................. 248/309.1; 15/268; 211/85.1; 248/902; 248/905
[58] Field of Search .............................. 206/233, 5, 581; 220/735; 211/85.1; 269/909; 15/268; 248/309.1, 316.7, 902, 298.1, 201, 905

[56] References Cited

U.S. PATENT DOCUMENTS

| | | | |
|---|---|---|---|
| 867,375 | 10/1907 | Huffman | 206/5 |
| 1,952,071 | 3/1934 | Hunter | 206/5 |
| 2,411,310 | 11/1946 | Wilkins | 206/233 X |
| 2,522,909 | 9/1950 | Wadanoli . | |
| 2,817,487 | 12/1957 | Wantz | 248/902 X |
| 2,930,567 | 3/1960 | Lloyd-Young | 248/902 X |
| 2,985,289 | 5/1961 | U'Ren | 206/233 X |
| 3,291,429 | 12/1966 | Neanhouse | 248/902 X |
| 3,307,687 | 3/1967 | Steinman | 206/233 X |
| 3,550,890 | 12/1970 | Kemp | 248/205 |
| 3,623,689 | 11/1971 | Johnston | 248/902 X |
| 4,903,925 | 2/1990 | Park | 248/206.1 |
| 5,082,225 | 1/1992 | Nespoli | 248/902 X |
| 5,363,532 | 11/1994 | Sargent | 248/902 X |

*Primary Examiner*—Derek J. Berger
*Attorney, Agent, or Firm*—Alvin S. Blum

[57] ABSTRACT

A cleaning station for cleaning eyeglasses holds a supply of tissue with one at a time dispensing, a spray bottle of lens, cleaning fluid and clips to hold the eyeglasses. The clips hold the eyeglasses in a position such that both sides of the lenses may be sprayed and wiped without wetting the tissue. The bottom of the station may be provided with material that prevents the station from sliding about when in use. The station is arranged so that all operations may be performed with one hand. This enables a person who has the use of only one hand to perform this common task without assistance.

13 Claims, 1 Drawing Sheet

EYEGLASSES HOLDER AND CLEANER STATION

BACKGROUND OF THE INVENTION

This invention relates to eyeglasses accessories, and more particularly to apparatus for holding tissues and eyeglasses during cleaning that is operable with one hand.

As people age, eyeglasses become more important in their lives. The development of cataracts may make it especially important that the glasses be scrupulously clean because light scattering is very bothersome. At the same time in life that clean eyeglasses become more important, the ability to clean them may become more difficult. The hands may become disabled by tremor, arthritis or stroke so that holding the frame with one hand and washing and wiping the lenses with the other becomes difficult or impossible. The short term memory also deteriorates so that it is more difficult to find the glasses, the cleaning solution and the tissues. If the person has no companion to help, this simple daily chore can become a burden.

SUMMARY OF THE INVENTION

It is accordingly an object of the invention to provide an eyeglasses cleaning station that will hold tissues, cleaning liquid and eyeglasses. It is another object that the device hold the glasses in such a position that both sides of the lenses may be exposed for spraying with cleaning liquid and for wiping with the tissues. It is yet another object that the device be easily operable with one hand.

The device of the invention comprises a dispensing container for a package of tissues, a recess for positioning a bottle of cleaning liquid, and a holder for gripping the glasses. The holder maintains the glasses in a stable position, so that opposite surfaces of the lenses are presented for spraying with liquid and wiping with tissue. The holding device is so arranged that the operator can simply push the eyeglasses onto the holding mechanism with one hand and it will hold the glasses in a firm position for single-handed spraying and wiping of both sides of both lenses.

These and other objects, features and advantages of the invention will become more apparent when the detailed description is studied in conjunction with the drawings, in which like reference characters indicate like elements in the various drawing figures.

DETAILED DESCRIPTION OF PREFERRED EMBODIMENTS

Figure 1:
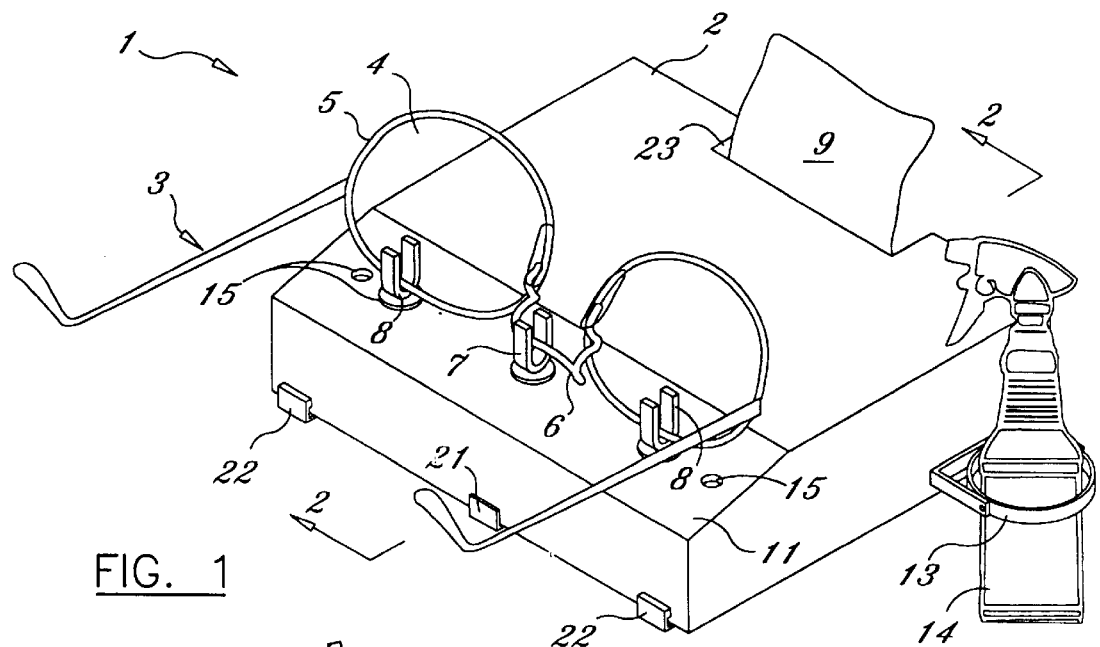
FIG. 1 is a front perspective drawing of the invention with eyeglasses shown in phantom.
Figure 2:
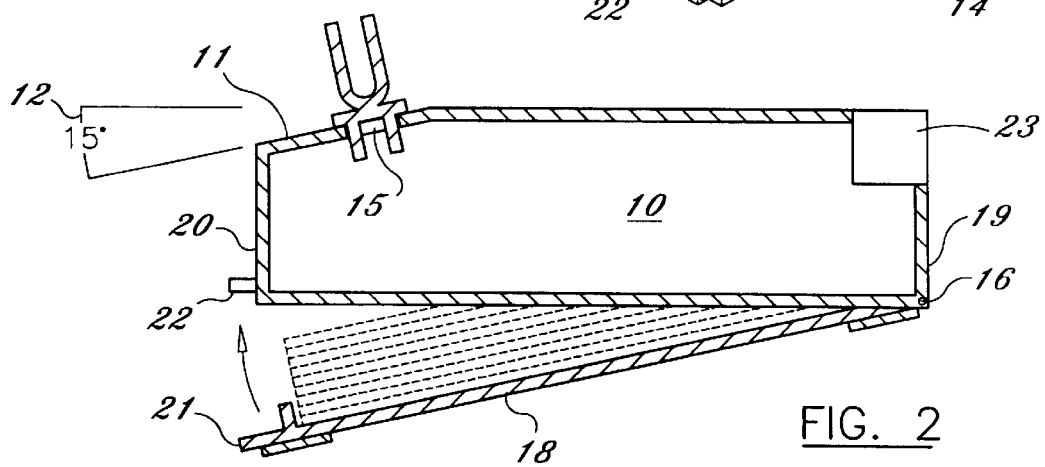
FIG. 2 is a sectional view taken through line 2—2 of FIG. 1 with the hinged bottom panel open for refilling with tissue.
Figure 3:
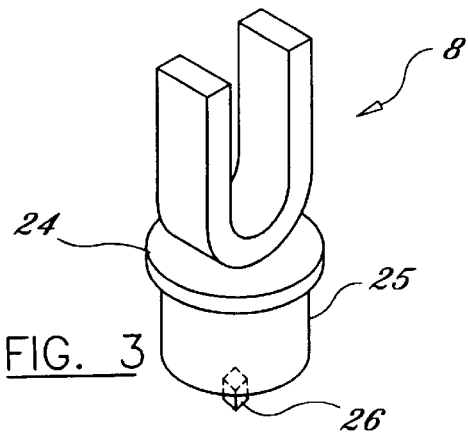
FIG. 3 is a detailed perspective view of one of the spring clips of FIG. 1.

Referring now to the drawings, the eyeglass cleaning station 1 comprises a cleaning tissue storage box 2 with an openable, bottom panel 18 connected along one side 19 to the box by hinge 16 that snaps shut along opposed side 20. The box 2 and panel 18 may be molded in one piece with the hinge 16. The panel may be opened with opposed tabs 21, 22 using one hand. It may then be filled with tissues 9 and snapped shut with one hand. The tissues are dispensed one at a time through tissue window 23.

On one side of the box is a molded-in springy bottle holder 13. This holds a spray bottle 14 of lens cleaning fluid that may be removed, operated and replaced with one hand. On the top of the box is a sloping panel 11 that is inclined at an angle of 15° from the horizontal. Apertures 15 in panel 11 are adapted to receive spring clips 7, 8. The central clip 7 removably holds the bridge 6 of an eyeglass frame. Spring clips 8 are adapted to removably hold the lens and/or frame at the lenses. The clips operate by simply pushing the frame down onto them. The eyeglasses are released by lifting the frame up. These maneuvers are easily performed with one hand. Multiple lateral apertures 15 enable the clips 8 to be moved closer together or farther apart to adjust for different size spectacles. The spring clips 8 may be provided with a shoulder 24 to bear against the top of panel 11, a cylindrical member 25 for penetrating the aperture 15 and locking tabs 26 to lock the clip in aperture 15 by 90° rotation after insert to prevent the clip from pulling out when the frame is lifted.

Figure 4:
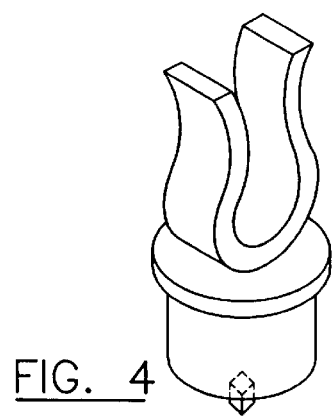
FIG. 4 is a perspective view of another embodiment of the spring clip.

FIG. 4 shows another embodiment of the clip.

The underside of bottom panel 18 may be provided with pads 40 that prevent the station from sliding about. The pads may be adhesive, hook-and-loop fasteners, or high friction material such as cork.

By virtue of the angle at which the eyeglasses are held by the spring clips, the lenses may be sprayed on both sides with fluid from bottle 14 without wetting tissue 9. A tissue may then be pulled free and used to wipe the lenses on both sides. All of these operations may be performed with one hand.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. An eyeglasses support and cleaning station for holding, spraying and wiping both faces of the pair of lenses of a pair of eyeglasses that is operable with one hand, the station comprising:

a tissue storage and dispensing means capable of holding and dispensing a supply of disposable tissues; and an eyeglasses engaging apparatus supported by an outer surface of said tissue storage and dispensing means, said apparatus capable of holding said eyeglasses with sufficient firmness to enable a user to spray and then wipe said lenses on both sides thereof while so held with one hand, and said apparatus being operable with one hand for engaging and disengaging said eyeglasses.

2. The station according to claim 1, further comprising holding means for holding a spray bottle of liquid, said holding means attached to said box means.

3. The station according to claim 2, in which said tissue storage and dispensing means is capable of shielding tissues held therein from liquid spray directed at said eyeglasses.

4. The station according to claim 1, in which said tissue storage and dispensing means is capable of shielding tissues held therein from liquid spray directed at said eyeglasses.

5. The station according to claim 1, in which said apparatus includes a spring clip arranged to engage a bridge of said eyeglasses.

6. The station according to claim 5, in which said apparatus includes a pair of spring clips with each one of said pair arranged to engage each one of said pair of lenses.

7. The station according to claim 6, in which the pair of spring clips are spaced apart from one another by an adjustable distance.

8. The station according to claim 7, further comprising means attached to the tissue storage and dispensing means on the underside thereof for preventing the station from sliding about.

9. An eyeglasses support and cleaning station for holding, spraying and wiping both faces of the pair of lenses of a pair of eyeglasses that is operable with one hand, the station comprising:

a tissue storage and dispensing means capable of holding and dispensing a supply of disposable tissues; and an eyeglasses engaging apparatus supported by an outer surface of said box means, said apparatus capable of holding said eyeglasses with sufficient firmness to enable a user to spray and then wipe said lenses on both sides thereof while so held with one hand, and said apparatus being operable with one hand for engaging and disengaging said eyeglasses; and holding means for holding a spray bottle of liquid, said holding means being attached to said tissue storage and dispensing means; in which said tissue storage and dispensing means is capable of shielding tissues held therein from liquid spray directed at said eyeglasses.

10. The station according to claim 9, in which said apparatus includes a spring clip arranged to engage a bridge of said eyeglasses.

11. The station according to claim 10, in which said apparatus includes a pair of spring clips with each one of said pair arranged to engage each one of said pair of lenses.

12. The station according to claim 11, in which the pair of spring clips are spaced apart from one another by an adjustable distance.

13. The station according to claim 9, further comprising means attached to the tissue storage and dispensing means on the underside thereof for preventing the station from sliding about.

* * * * *